(12) United States Patent
Serita et al.

(10) Patent No.: US 10,915,563 B2
(45) Date of Patent: Feb. 9, 2021

(54) ANALYSIS SERVER DEVICE, DATA ANALYSIS SYSTEM, AND DATA ANALYSIS METHOD

(71) Applicant: HITACHI, LTD., Tokyo (JP)

(72) Inventors: Susumu Serita, Tokyo (JP); Yoshiyuki Tajima, Tokyo (JP); Tomoaki Akitomi, Tokyo (JP); Fumiya Kudo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 195 days.

(21) Appl. No.: 15/756,321

(22) PCT Filed: Mar. 28, 2016

(86) PCT No.: PCT/JP2016/059940
§ 371 (c)(1),
(2) Date: Feb. 28, 2018

(87) PCT Pub. No.: WO2017/168524
PCT Pub. Date: Oct. 5, 2017

(65) Prior Publication Data
US 2018/0246958 A1    Aug. 30, 2018

(51) Int. Cl.
*G06F 16/35* (2019.01)
*G06F 16/00* (2019.01)
*H04L 12/24* (2006.01)

(52) U.S. Cl.
CPC ........... *G06F 16/353* (2019.01); *G06F 16/00* (2019.01); *H04L 41/065* (2013.01); *H04L 41/0631* (2013.01)

(58) Field of Classification Search
None
See application file for complete search history.

(56) References Cited

U.S. PATENT DOCUMENTS

| 9,288,123 B1 * | 3/2016 | Safford ............ G06Q 50/01 |
| 2004/0186835 A1 | 9/2004 | Sakurai |

(Continued)

FOREIGN PATENT DOCUMENTS

| JP | 2004-287798 A | 10/2004 |
| JP | 2011-123652 A | 6/2011 |

OTHER PUBLICATIONS

Jain et al., "Extracting the Textual and Temporal Structure of Supercomputing Logs" 2009 International Conference on High Performance Computing (HiPC), Kochi, 2009, pp. 254-263 (Year: 2009).*

(Continued)

*Primary Examiner* — John C Kuan
(74) *Attorney, Agent, or Firm* — Mattingly & Malur, PC

(57) ABSTRACT

Provided is a technique for extracting a factor (event pattern) that has an influence on an objective index (objective variable). A data analysis device according to the present disclosure performs: a process of generating, with respect to explanatory variable data included in data to be analyzed, a time-series pattern in a predetermined range; a process of calculating a correlation value between the time-series pattern and at least one item of objective variable data included in the data to be analyzed; and a process of outputting, together with the correlation value, the time-series pattern corresponding to the correlation value as an analysis result.

7 Claims, 11 Drawing Sheets

(56) References Cited

U.S. PATENT DOCUMENTS

2014/0108100 A1* 4/2014 Moriwaki .......... G06Q 10/0639
                                                    705/7.38
2016/0292197 A1* 10/2016 Morimoto ............. G06F 16/285
2017/0109324 A1* 4/2017 Mizoguchi ............... G07C 3/14

OTHER PUBLICATIONS

Sakurai et al., "Analysis of Daily Business Reports Based on Sequential Text Mining Method" 2004 IEEE International Conference on Systems, Man and Cybernetics (Year: 2004).*
Kenji Arai, et al., "A Method for Multi Stream Prediction Based on Correlation Using Simultaneous Observation Cluster Group," IPSJ SIG Technical Report, vol. 111 No. 477, Mar. 5, 2012, pp. 183-190.
Yasushi Sakurai, et al., "Stream Mining Techniques for Time-Series Data", IPSJ Magazine, Jul. 15, 2006, vol. 47, No. 7, pp. 755 to 761.
Yunyue Zhu, et al., "StatStream: Statistical Monitoring of Thousands of Data Streams in Real Time," Proceedings of the 28th VLDB Conference, Aug. 20, 2002, pp. 358-369.
English translation of Written Opinion and International Search Report of PCT/JP2016/059940 dated May 10, 2016.

* cited by examiner

FIG. 5

(a) Abstraction explanatory variable table

| Explanatory variable record ID | Session ID | Time | Event A | Event B | Event C |
|---|---|---|---|---|---|
| 1 | 1 | 2015/12/17 10:00:32 | a1 | b1 | c1 |
| 2 | 1 | 2015/12/17 10:00:33 | a1 | b2 | c2 |
| 3 | 1 | 2015/12/17 10:00:36 | a2 | b2 | c5 |
| 4 | 1 | 2015/12/17 10:01:02 | a2 | b3 | c2 |
| 5 | 1 | 2015/12/17 10:13:32 | a1 | b1 | c6 |
| 6 | 2 | 2015/12/17 10:03:15 | a4 | b1 | c2 |
| ... | ... | ... | ... | ... | ... |

(b) Event table

| Event ID | Generation source column | Data type | Event representation |
|---|---|---|---|
| a1 | Remaining memory | Numerical value | [53000-54000] |
| a2 | Remaining memory | Numerical value | [54000-55000] |
| ... | ... | | |
| b1 | Process | Text | processA |
| b2 | Process | Text | processB |
| ... | ... | ... | |
| c1 | Message | Text | Router * interface * down |
| c2 | Message | Text | Authentication * fail * |

FIG. 6

| Column ID | Pattern type | Maximum number of elements | Window width (number) | Window width (time) | Minimum frequency |
|---|---|---|---|---|---|
| Remaining memory | n-gram | 5 | - | 10min | 0.1 |
| Remaining memory | Association | 4 | 10 | - | 0.1 |
| Remaining memory | Sequence | 3 | 10 | 10min | 0.1 |
| Process | N-gram | 3 | - | 20min | 0.2 |

FIG. 7

| Pattern ID | Pattern type | Time-series pattern | Appearance session list (session ID, number of times) |
|---|---|---|---|
| 1 | 2-gram | a1=>a2 | (1, 4), (2, 3), |
| 2 | 2-gram | a1=>a3 | (1, 4), (2, 2), |
| 3 | Association | {a1, a2} | (1, 2), (3, 2), |
| 4 | Sequence | a1>a3 | (1, 5), (2, 3), (3, 2) |

FIG. 8

| Pattern ID | Objective variable 1 | Objective variable 2 | ... |
|---|---|---|---|
| 1 | 0.42 | 0.23 | |
| 2 | 0.8 | 0.1 | |
| 3 | 0.1 | -0.69 | |
| ... | ... | ... | ... |

801 Pattern ID
802 Correlation value column
207

FIG. 9

Text set — 901

⇩ Clustering

902

| Cluster ID | Original text |
|---|---|
| 1 | Router 1 interface 192.168.1.1 down |
| | Router 2 interface 192.168.1.2 down |
| | Router 3 interface 192.168.1.3 down |
| 2 | Authentication user1 fail at server3 |
| | Authentication user3 fail at server6 |
| ... | ... |

⇩ Generation of abbreviated expression

903

| Cluster ID | Abbreviated expression |
|---|---|
| 1 | Router * interface * down |
| 2 | Authentication * fail * |

FIG. 14
(a) Time-series pattern display screen
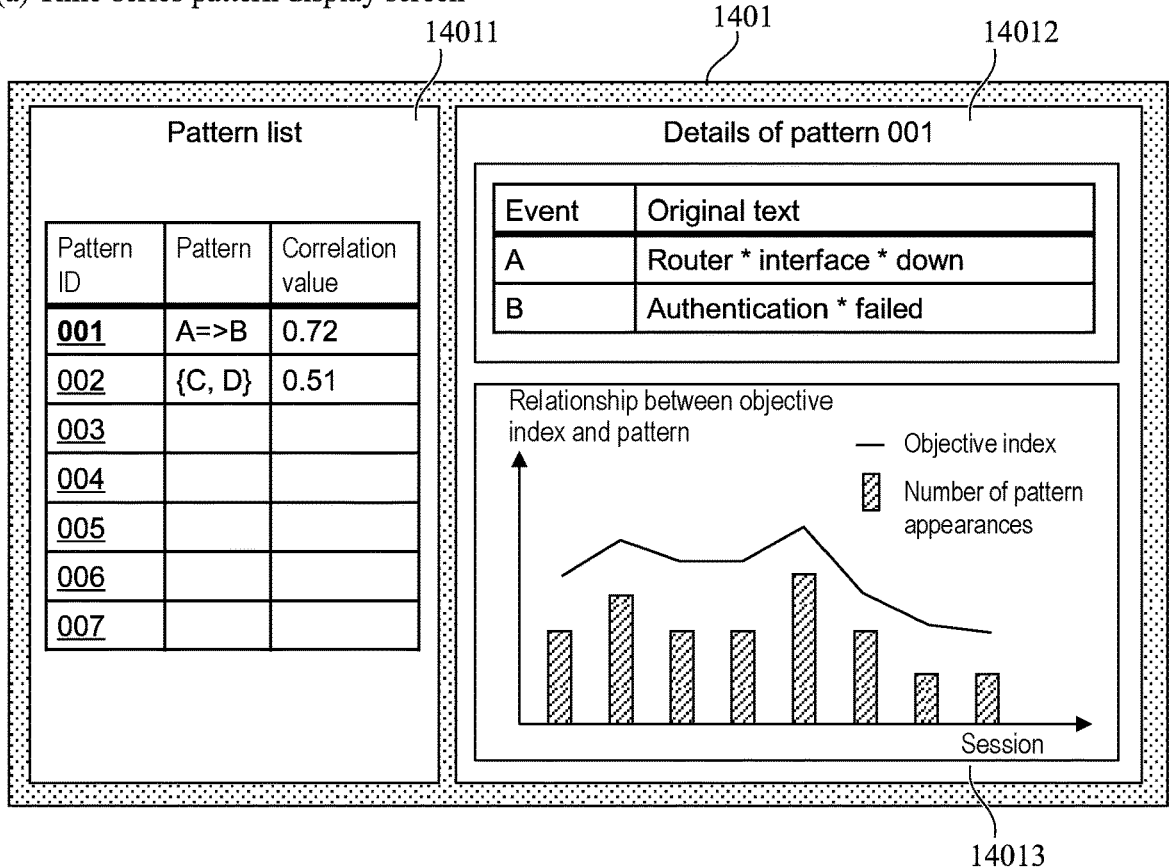
(b) Data to be analyzed view screen
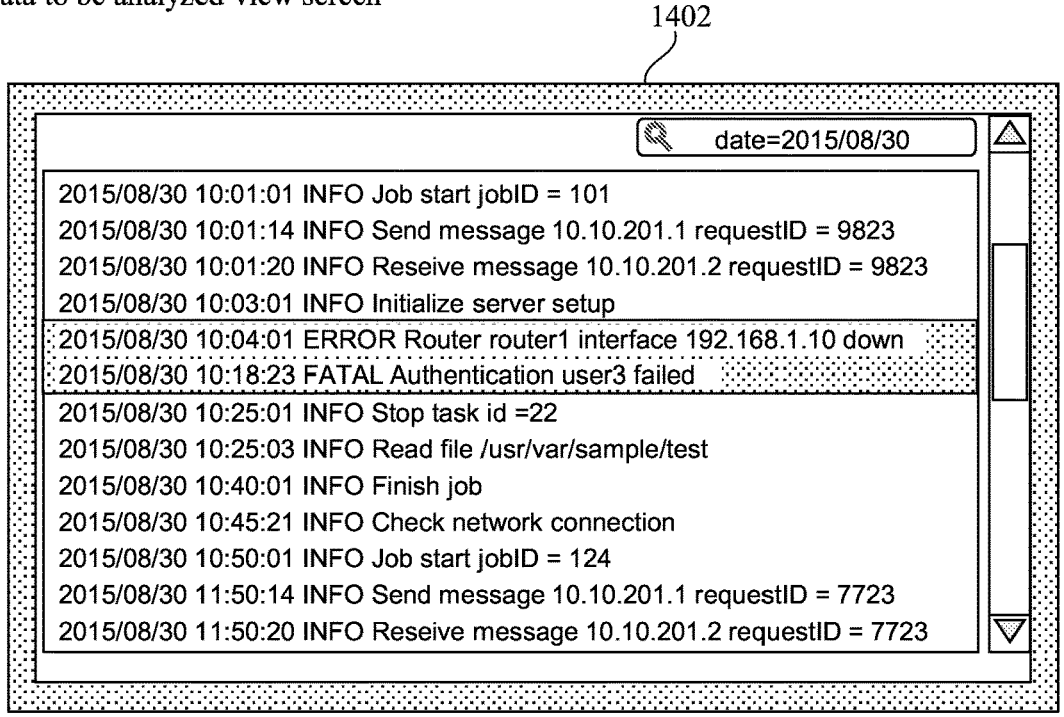

ANALYSIS SERVER DEVICE, DATA ANALYSIS SYSTEM, AND DATA ANALYSIS METHOD

TECHNICAL FIELD

The present disclosure relates to an analysis server device, a data analysis system, and a data analysis method.

BACKGROUND ART

In order to draft measures for improving operations, or to discover the cause of a problem of a system, it is effective to analyze data generated in the organization. For example, in the field of retail and distribution, an analysis of the purchase history data of customers may enable the discovery of the customers with high sales per customer or the products that tend to be purchased simultaneously. An analysis of log data of a server being managed by the IT department may make it possible to find a program or user behaviors that are the cause of an increase in server load.

The data to be analyzed may have a format in which the times of occurrence of events of some kind and the content of the events are arranged in time-series. The time intervals may be in the unit of seconds, months and the like and may differ between data, and the event content may have various formats including numerical value data, such as the temperature of the air, or texts, such as product names. These data may be collectively referred to as time-series data. In order to gain knowledge from time-series data, it has been contemplated to extract rules of event occurrence (which may be referred to as a time-series pattern).

For example, Patent Literature 1 discloses the feature of extracting a frequently appearing time-series pattern with respect to each of time-series data which include numerical value data as information elements, time-series data which include text data as information elements, and time-series data which include numerical value data and text data as information elements. Specifically, a key concept is extracted from the numerical value data and text data, and extraction of a frequently appearing time-series pattern is performed with respect to the time-series data constituted by the extracted key concept. In this way, it becomes possible to discover, from a daily report and the like containing sales data or operating reports in the retail sector, a chronological regularity (time-series pattern) in which the flow of time underlying the data is considered. Patent Literature 1 also indicates that a frequently appearing time-series pattern can be extracted from time-series data including numerical values and texts.

CITATION LIST

Patent Literature

Patent Literature 1: JP 2004-287798 A

SUMMARY OF INVENTION

Technical Problem

However, in Patent Literature 1, it is merely that a time-series pattern (the time-series pattern that occurred more often in time-series data) is extracted based on the occurrence frequency, where the time-series pattern having high frequency does not necessarily influence the objective index (objective variable). Accordingly, in this case, it is impossible to perform an analysis involving the extraction of a time-series pattern that contributes to the objective index (objective variable, such as sales). In addition, in order to extract a key concept from numerical value data and text data, it is necessary to set a rule for key concept extraction in advance. Thus, an analysis cannot be performed in the absence of deep knowledge about the data of interest.

The present disclosure is based on the above circumstance, and provides a technique for extracting the factor (event pattern) that influences an objective index (objective variable).

Solution to Problem

In order to solve the problem, a data analysis device according to the present disclosure performs a process of generating, with respect to explanatory variable data included in data to be analyzed, a time-series pattern in a predetermined range; a process of calculating a correlation value between the time-series pattern and at least one objective variable data included in the data to be analyzed; and a process of outputting, together with the correlation value, a time-series pattern corresponding to the correlation value as an analysis result.

Additional features of the present disclosure will become apparent from the following descriptions of the description and the attached drawings. The modes of the present disclosure may be implemented by various elements or various combinations of the elements, or by the following detailed descriptions and the embodiments set forth in the attached claims.

It is to be understood that the disclosure of the description is merely exemplary and not to be taken as in any way limiting the scope of the claims of the present disclosure or application examples thereof.

Advantageous Effects of Invention

A factor (data) that has an influence on an objective index can be extracted without the user making a hypothesis.

BRIEF DESCRIPTION OF DRAWINGS

FIG. 5 illustrates an example of abstraction data 202 obtained by abstraction of an example of the explanatory variable table 127 of FIG. 4.

FIG. 6 is a diagram illustrating an example of a time-series data analysis parameter 204 according to the present embodiment.

FIG. 7 is a diagram illustrating an example of a time-series pattern table 205 according to the present embodiment.

FIG. 8 is a diagram illustrating an example of a time-series analysis result 207 according to the present embodiment.

FIG. 9 illustrates an example of a text abstraction process according to the present embodiment.

FIG. 14 illustrates examples of display screens for an analysis result report according to the present embodiment.

DESCRIPTION OF EMBODIMENTS

Figure 1:
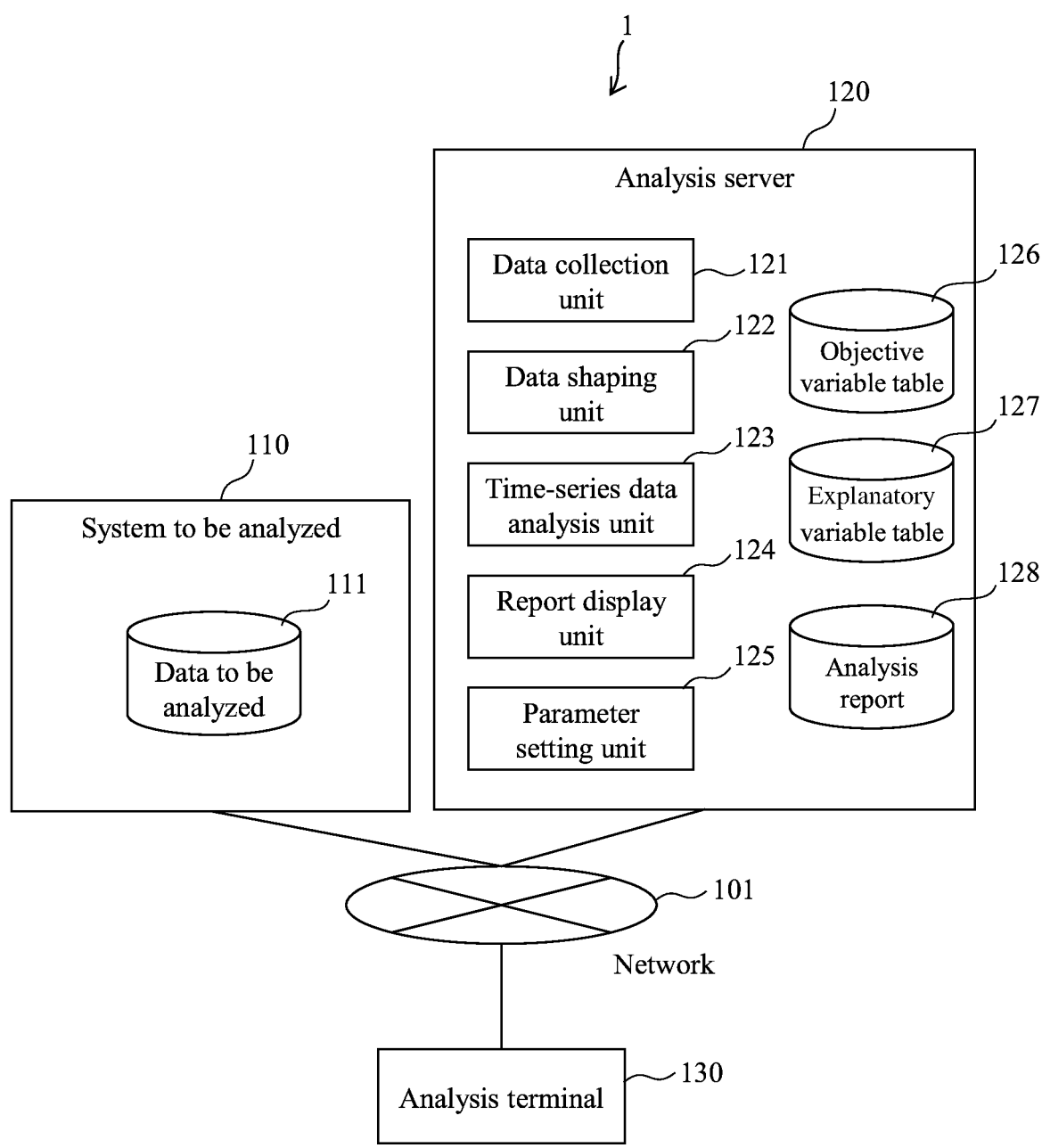
FIG. 1 is a diagram illustrating a schematic configuration example of a time-series data analysis system 1 according to the present embodiment.

In the present disclosure, a time-series pattern other than frequency that contributes to a general objective index (objective variable) is extracted from an event that appears in an explanatory variable, and the correlation between the time-series pattern and the objective variable is calculated. By thus finding the correlation between the extracted time-series pattern and the objective variable, it becomes possible to know the time-series pattern of an event that has an influence on the objective variable. In addition, in the present embodiment, when the time-series pattern is extracted, the content of each event of the explanatory variable is abstracted in accordance with a predetermined rule. In this way, it becomes possible to reduce the types of values of the explanatory variable, and to extract a time-series pattern that is easy to understand. It also becomes possible to analyze the time-series data without requiring prior knowledge about texts or numerical values.

In the following, embodiments of the present disclosure will be described with reference to the attached drawings. In the attached drawings, functionally similar elements may be designated with similar numerals. While the attached drawings illustrate specific embodiments and implementation examples in accordance with the principles of the present disclosure, it will be understood that they are set forth in order to provide an understanding of the present disclosure and are not to be taken as limiting the present disclosure.

While the embodiments will be described in sufficient detail to enable a person skilled in the art to practice the present disclosure, it is to be understood that other modes of implementation may also be possible, and that various modifications in configuration or structures or replacements of various elements may be made without departing from the scope and spirit of the technical concept of the present disclosure. Therefore, the following detailed description is not to be taken in a limiting sense.

The present embodiment, as will be described later, may be implemented by software running on a general-purpose computer, dedicated hardware, or a combination of software and hardware.

While in the following description various items of information in the present disclosure will be described in "table" format, the information is not necessarily required to be represented in a tabular data structure, and may be represented by data structures such as a list, a database (DB), or a cue. Accordingly, in order to indicate the data structure independence, "table", "list", "DB", "cue" and the like may be simply referred to as "information".

When the content of each item of information is described, expressions such as "identification information", "identifier", "designation", "name", and "ID" may be interchangeably used.

In the following, various processes in the present embodiment will be described with reference to various processing units (such as a time-series data analysis unit) of a program as the subject (agent of operation), where the program is executed by a processor (CPU) to perform certain processes with the use of memory and a communication port (communication control device). Thus, the processor may be considered the subject. A process described with reference to a program as the subject may include a process performed by a computer such as a management server, or an information processing device. A program may be partly or entirely realized using dedicated hardware, or may be in modular form. Various programs may be installed in computers via a program distribution server or storage media.

<Configuration of Time-Series Data Analysis System>

FIG. 1 is a diagram illustrating a schematic configuration example of a time-series data analysis system 1 according to the present embodiment.

As illustrated in FIG. 1, the time-series data analysis system 1 includes a system to be analyzed 110, an analysis server 120, and an analysis terminal 130. The devices are mutually connected via a network 101. While FIG. 1 illustrates the configuration in which the devices are connected via the network 101, the devices may be directly connected not through a network.

The system to be analyzed 110 generally refers to a system that is the object of analysis, where the specific system may differ depending on the organization to which the system belongs to, or the purpose of analysis. For example, the system to be analyzed 110 may refer to a point of sales (POS) system for managing sales and inventory in the retail and distribution sectors, or to a warehouse management system (WMS) in the commodity distribution sector. The system to be analyzed may also include a mail system and groupware that may be used commonly in various sectors. The system to be analyzed 110 has stored various data generated in the system, and the data are referred to as data to be analyzed 111. For example, if the system to be analyzed 110 is a POS system, the data to be analyzed 111 include information about what product was sold how much and when. In the present embodiment, the specific form of the system to be analyzed 110 is not limited. In the following, however, an information-based system will be described by way of example for purposes of illustration.

The analysis server 120 is a server which performs an analysis of time-series data, and includes: an objective variable table storage unit (hereafter "storage unit" may be omitted as appropriate) 126; an explanatory variable table storage unit (hereafter "storage unit" may be omitted as appropriate) 127; an analysis report storage unit (hereafter "storage unit" may be omitted as appropriate) 128; and, as a program, a data collection unit 121, a data shaping unit 122; a time-series data analysis unit 123; a report display unit 124; and a parameter setting unit 125.

The objective variable table 126 is a table in which one or more objective variables are stored. The objective variable (which may also be referred to as "objective index"), for example, is a variable (variable as the object of prediction or analysis) for which the factor causing a variation in its value is desired to be analyzed, such as the sales of a retail store or the CPU load of a server. The objective variable is expressed as numerical value data on an analysis unit basis (such as by the retail store or date). The details of the objective variable table 126 will be described with reference to FIG. 3.

The explanatory variable table 127 is a table in which one or more explanatory variables are stored. The explanatory variable is a variable that possibly has an influence on the objective variable. For example, with respect to the objective variable such as sales or server load, the explanatory variable may include the customer segment (such as age and sex), or the name of a process running on the server. The details of the explanatory variable table 127 will be described with reference to FIG. 4.

The analysis report 128 has stored the results of an analysis performed by the analysis server 120 with respect to data for analysis. For example, the analysis report 128 includes a time-series pattern that contributes to the objective index (such as sales). The analysis report 128 is displayed on a display screen (not illustrated) of the analysis terminal 130 via the report display unit 124.

The data collection unit 121 has the function of connecting to the system to be analyzed 110 and acquiring the data to be analyzed 111. The location for storing the acquired data is designated in advance by the one who performs the analysis (analyst; or simply "user"). The timing for acquiring the data is also designated in advance by the analyst. The data may be acquired regularly, such as once a day, or may be acquired at the timing at which the analyst has given an acquisition instruction. Generally, the data retained in the analyzed system have various formats. For example, the data may be retained in the form of a comma separated values (CSV) file or a database. The data collection unit 121, after collecting such data, converts the data into a unified format (such as relational database format).

The data shaping unit 122 has the function of removing outliers, deleting deficient data and the like with respect to the data to be analyzed 111 acquired by the data collection unit 121. The data shaping unit 122 also provides the function of enabling the analyst to generate the explanatory variable table 127 and the objective variable table 126 from the object of analysis.

The time-series data analysis unit 123, for example, performs the process (the central process of the present system) of reading the objective variable table 126 and the explanatory variable table 127, and extracting a time-series pattern that contributes to the objective variable. The details of the time-series data analysis unit 123 will be described with reference to FIG. 2.

The report display unit 124 has the function of displaying the analysis report 128 generated by the time-series data analysis unit 123 on the analysis terminal 130.

The parameter setting unit 125 has the function of enabling the analyst to set the parameters of the analysis server 120. The parameters to be set include the timing of data acquisition by the data collection unit 121 as well as a time-series analysis parameter as will be described with reference to the drawings.

The analysis terminal 130 is a terminal for the analyst to access the analysis server 120. The analyst utilizes the analysis terminal to set parameter of the analysis server 120 or to view the analysis report 128, for example.

The devices connected to the network may be constituted by a conventional computer, and may include at least: a central processing unit (CPU); an auxiliary storage device such as a hard disk drive; a main storage device such as read only memory (ROM); an input/output (I/O) interface for connection with an input device such as a keyboard and mouse; and a network interface for connection with a local area net and the internet.

The various programs for analyzing the data to be analyzed (data collection unit 121, data shaping unit 122, time-series data analysis unit 123, report display unit 124, and parameter setting unit 125), the objective variable table 126, the explanatory variable table 127, and the analysis report 128 may be stored in the auxiliary storage device.

<Outline of a Process of Time-Series Data Analysis Unit>

Figure 2:
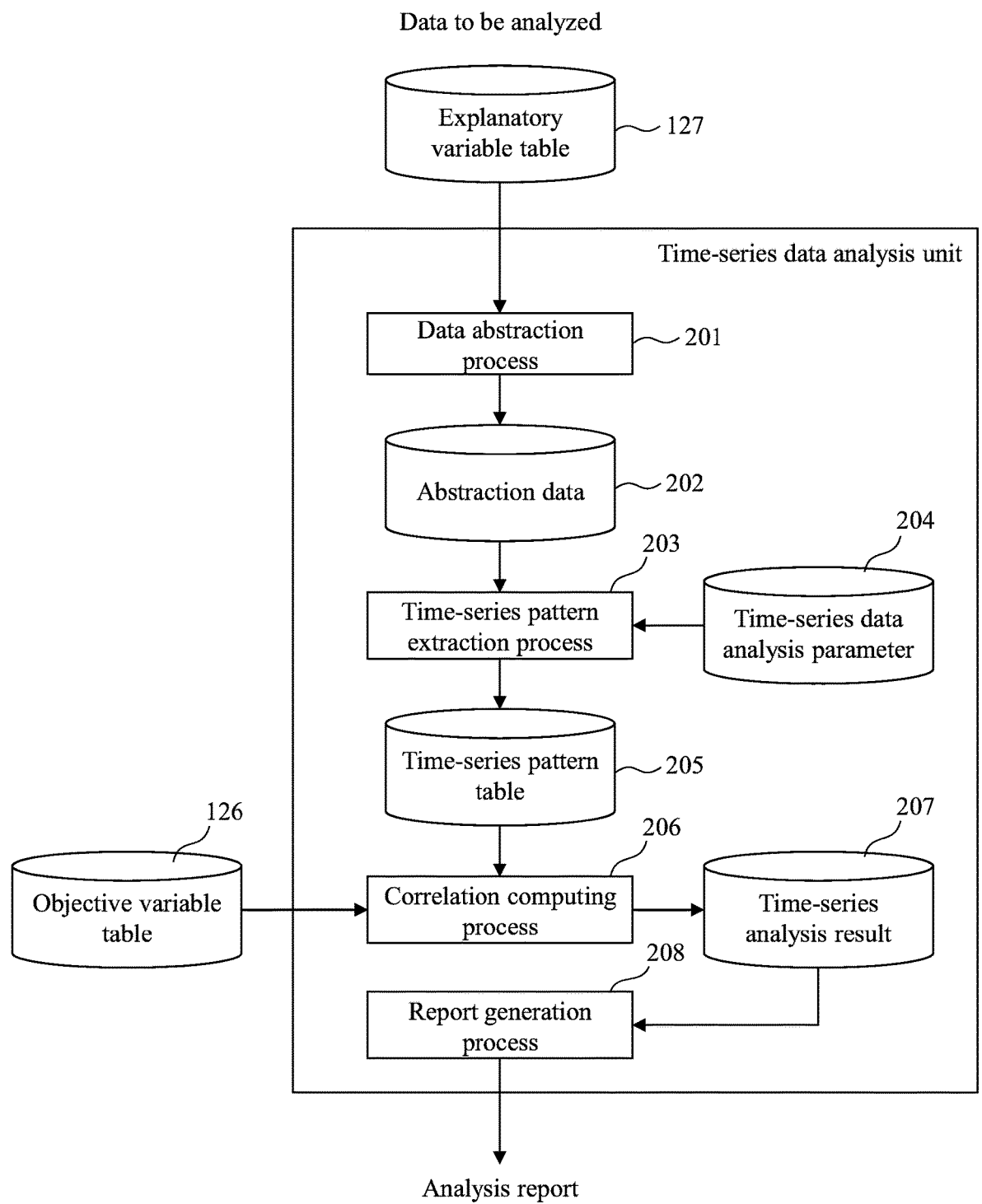
FIG. 2 is a diagram for describing the outline of a process performed by a time-series data analysis unit 123 according to the present embodiment.

FIG. 2 is a diagram for describing the outline of a process performed by the time-series data analysis unit 123 as a program according to the present embodiment.

The time-series data analysis unit 123, in an example, performs: a data abstraction process 201; a process (abstraction data 202) for storing an abstracted explanatory variable in a storage device; a time-series pattern extraction process 203 for reading the time-series data analysis parameter 204 and extracting a time-series pattern from the abstracted explanatory variable; a process for storing the extracted time-series pattern in the time-series pattern table 205; a correlation computing process 206 for reading an objective variable as the object of analysis from the objective variable table 126, and computing a correlation with the time-series pattern; a process for storing the obtained correlation value in the time-series analysis result 207; and a report generation process 208 for generating a report.

In the data abstraction process 201, the time-series data analysis unit 123 reads the explanatory variable table 127 and generates the abstraction data 202. The explanatory variable table 127 has stored time-series data comprising numerical values and/or text data. Generally, numerical value data are expressed in real values. Even when the range of recorded values is limited (such as 0 to 1 inclusive), if the width of variation in value is small (such as when varying in 0.0001 units), the possible types of value may become numerous. If a time-series pattern is to be extracted with respect to such numerical sequence, it is necessary to code the numerical values. This is because if a time-series pattern is extracted without coding, the types of time-series pattern would become numerous, and it would become difficult for the analyst to interpret the results. The coding may include a method whereby the numerical values are divided at regular intervals, or a method whereby a hidden state of a numerical sequence is estimated. The value types may also become numerous when the explanatory variable comprises text data. For example, a message of a log output from a server has a number of parameters that vary, such as IP address, and the types of message is increased. As in the case of numerical values, in order to extract a time-series pattern from a text sequence, it is necessary to code a plurality of texts at once. In the present embodiment, as will be described later, clustering is performed based on text similarity for coding. The process of converting a numerical value or text into a code is referred to as data abstraction. The details of the data abstraction process 201 will be described with reference to FIG. 11.

The abstraction data 202 are the result of the data abstraction process 201. The abstracted data are represented by a label, for example. The details of the abstraction data 202 will be described with reference to FIG. 5.

In the time-series pattern extraction process 203, the time-series data analysis unit 123 extracts from the abstraction data 202 candidates of a time-series pattern that may possibly contribute to the objective variable. In this state, only the time-series patterns as candidates are extracted. Whether a time-series pattern actually contributes to the objective variable is determined by the computing correlation computing unit 206 computing a correlation value. The details of the time-series pattern extraction process 203 will be described with reference to FIG. 12.

The time-series analysis parameter 204 retains information necessary to extract a time-series pattern from the abstraction data 202 in the time-series pattern extraction process 203. The time-series analysis parameter 204 may be set in advance by the analyst via the parameter setting unit 125, or the time-series data analysis system 1 may request the analyst to make an input when the time-series pattern extraction process 203 is performed. The details of the time-series analysis parameter 204 will be described with reference to FIG. 6.

The time-series pattern table 205 retains candidates of a time-series pattern that contributes to the objective variable. The details of the time-series pattern table 205 will be described with reference to FIG. 9.

In the correlation computing process 206, the time-series data analysis unit 123 computes, from the objective variable table 126 and the time-series pattern table 205, a correlation value between the objective variable and the time-series pattern. The time-series data analysis unit 123, if there is a plurality of combinations of objective variable and time-series pattern, computes the correlation value with respect to all of the combinations. By computing the correlation value, it becomes possible to quantify the influence of each time-series pattern on the objective variable. The details of the correlation computing process 206 will be described with reference to FIG. 13.

The time-series analysis result 207 retains the correlation value between objective index and time-series pattern obtained by the correlation computing process 206. The details of the time-series analysis result 207 will be described with reference to FIG. 8.

In the report generation process 208, the time-series data analysis unit 123 reads the time-series analysis result 207 and generates the analysis report 128. Specifically, the time-series data analysis unit 123, based on the time-series analysis result 207, performs a process, e.g., of extracting only a time-series event that has the absolute value of the correlation value not less than a certain threshold value (such as 0.5) with respect to the objective variable. The time-series data analysis unit 123 also generates, e.g., a graph indicating the transition of the occurrence frequency of a time-series pattern, or a list of time-series events having high correlation with respect to the objective variable. The generated analysis report 128 is displayed by the report display unit 124 on the screen of the analysis terminal 130. The details of the screen will be described with reference to FIG. 14.

<Example of Objective Variable Table>

Figure 3:
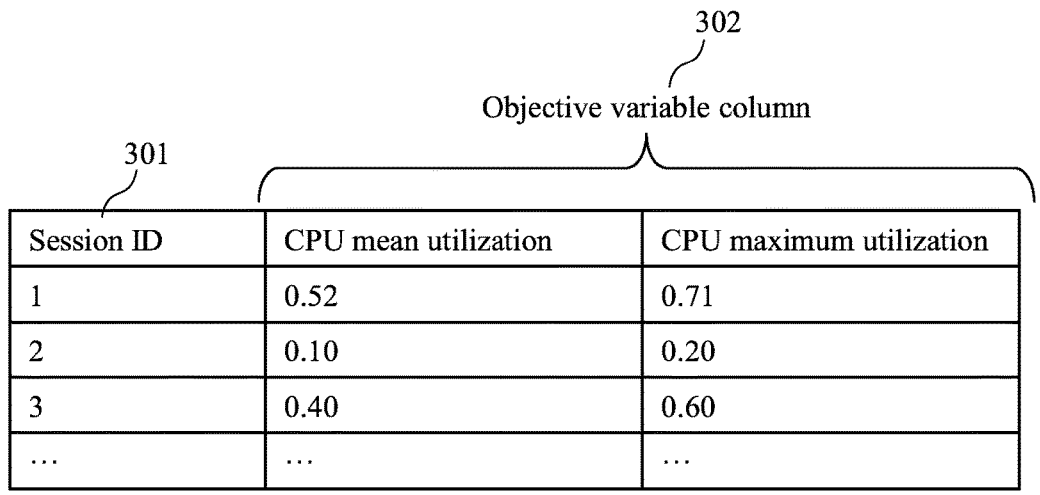
FIG. 3 is a diagram illustrating an example of an objective variable table 126 according to the present embodiment.

FIG. 3 is a diagram illustrating an example of the objective variable table 126 according to the present embodiment. As described above, the present disclosure may be applied regardless of the type of the system to be analyzed 110. In the following, however, an information-based system (such as a mail system or groupware) is assumed as the system to be analyzed 110 for purposes of illustration. The objective variable table 126, as described above, retains a variable (variable as the object of prediction or analysis) which is extracted from the data to be analyzed 111 and for which the factor causing a variation in a resultant value is desired to be analyzed, such as the sales of a retail store or the CPU load of a server. The data to be analyzed 111 are assumed to comprise a log output from the information-based system. For example, in the information-based system, the data to be analyzed 111 include record ID, time, CPU utilization, remaining memory, process, and message. Herein, the purpose of analysis is to discover an element that has an influence on an increase in CPU load in terms of a time-series pattern of remaining memory, process, and message.

The objective variable table 126 includes the constituent items of session ID 301 and objective variable columns 302.

The session ID 301 is identification information for uniquely specifying or identifying the records of the objective variable table 126. A session herein refers to a desired unit for analysis. The session may be defined at certain time intervals (such as 30 minutes), or determined based on a column included in the data to be analyzed 111 (for example, data with the same host name may constitute the same session).

The objective variable columns 302 are columns in which the values of the objective variable are stored, and include one or more columns. The objective variable differs depending on the system to be analyzed 110 and the purpose of analysis. For example, when it is desired to know the factor causing an increase in the sales of a retail store, the sales on a retail store by retail store basis constitutes the objective variable. In the example of FIG. 3, the objective variable columns 302 designate CPU average utilization and CPU maximum utilization.

In the objective variable table 126, the objective variable value is recorded for each session. In the example of FIG. 3, it is indicated that the CPU average utilization was 52% during certain 30 minutes and 10% in the next 30 minutes.

<Example of Explanatory Variable Table>

Figure 4:
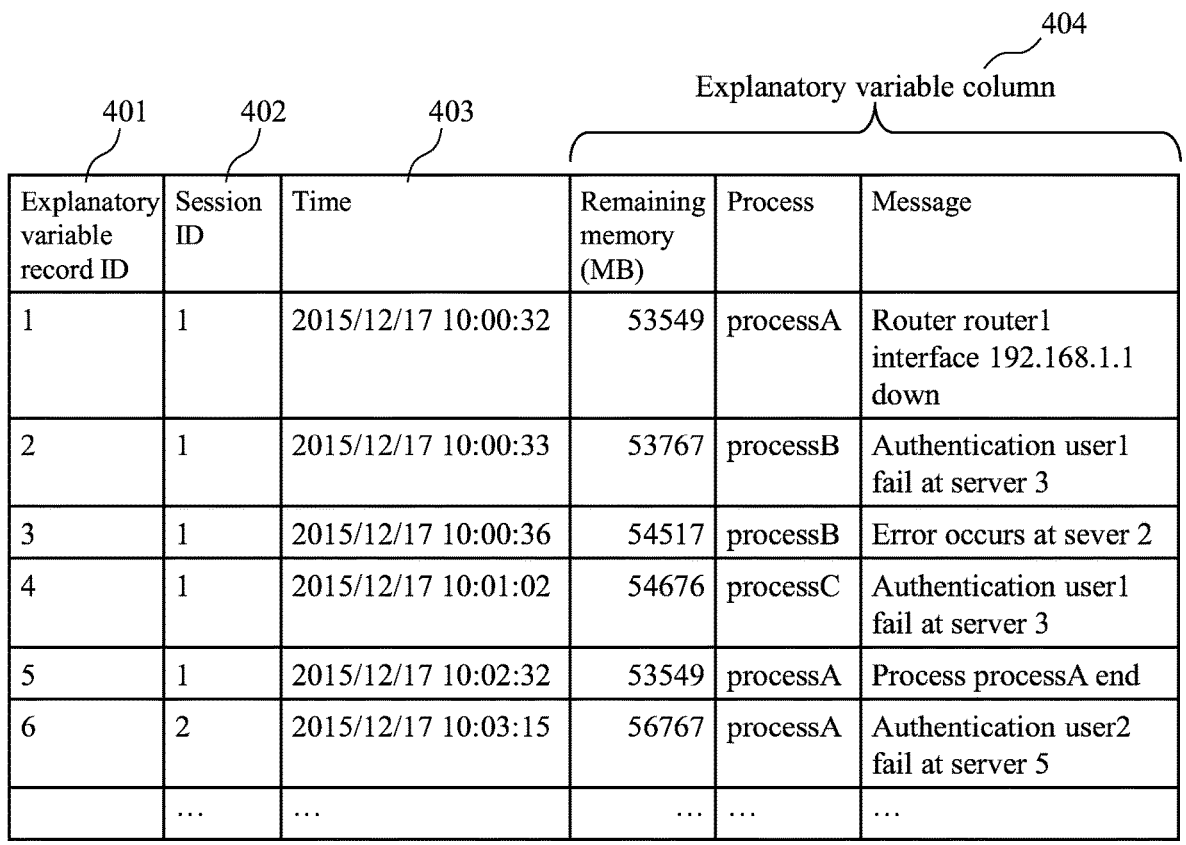
FIG. 4 is a diagram illustrating an example of an explanatory variable table 127 according to the present embodiment.

FIG. 4 is a diagram illustrating an example of the explanatory variable table 127 according to the present embodiment. The explanatory variable table 127 retains variables extracted from the data to be analyzed 111 that may possibly have an influence on the objective variable.

The explanatory variable table 127 includes the constituent items of explanatory variable record ID 401, session ID 402, time 403, and explanatory variable columns 404.

The explanatory variable record ID 401 is an identifier uniquely identifying the records of the explanatory variable table 127.

The session ID 402 is information corresponding to the session ID 301 of the objective variable table 126. However, while in the objective variable table 126, the session ID 301 is the unique key, the information may not be a unique key in the explanatory variable table 127, where a plurality of different records with the same session ID may be present. In the present example, because the session is on the 30 minutes unit basis, the events that occurred in a certain 30 minutes all have the same session ID.

The time 403 indicates the time of occurrence of an event.

The explanatory variable columns 404 are columns in which the explanatory variable values are stored, and include one or more columns. In the example of FIG. 4, remaining memory, process, and message are utilized as the explanatory variables.

Conventional time-series pattern extract methods are based on the problem setting in which a time-series pattern that frequently appears in the explanatory variable table 127 is extracted. On the other hand, the present embodiment has adopted the problem setting in which a time-series pattern that has an influence on the values of the objective variable table 126 is extracted from the explanatory variable table 127, thereby enabling an analysis that has not been handled by the conventional technique.

<Example of Abstraction Data>

FIG. 5 is a diagram illustrating an example of the abstraction data 202 obtained by abstraction of the example of the explanatory variable table 127 of FIG. 4. The abstraction data 202 are constituted by, e.g., abstraction explanatory variable table 501 and event table 502. Obviously, the data may include other information.

The abstraction explanatory variable table 501 retains data obtained by abstraction of the explanatory variable column 403 of the explanatory variable table 127. The abstraction explanatory variable table 501 includes the constituent items of explanatory variable record ID 5011, session ID 5012, time 5013, and abstraction explanatory variable column 5014.

The explanatory variable record ID 5011, session ID 5012, and time 5013 are identical to the explanatory variable record 401, session ID 402, and time 403 in the explanatory variable table 127 (see FIG. 4).

The abstraction explanatory variable column 5014 retains values obtained by abstraction of the explanatory variable columns 404 of the explanatory variable table 127. In the data abstraction process 201, all of the values of the variables of the explanatory variable columns 404 are converted into events. The events may be represented by labels, for example. In the example of FIG. 5, "remaining memory" is abstracted and stored as "event A", and "process" is abstracted and stored as "event B", and "message" is abstracted and stored as "event C". The values that have been numerical values or text in the explanatory variable table 127 are all expressed by labels in the abstraction explanatory variable table 501. In the example of FIG. 5, the value of event A for record ID=1 is "a1". The meaning of "a1" is defined by the event table 502. The details of the data abstraction process will be described with reference to FIG. 11.

The event table 502 retains information about the events generated by the data abstraction process 201. The event table 502 includes the constituent items of event ID 5021, generation source column 5022, data type 5023, and event expression 5024.

The event ID 5021 is identification information for uniquely specifying or identifying the event. The values (abstracted values) of the abstraction explanatory variable column 5014 of the abstraction explanatory variable table 501 are used for the event ID 5021.

The generation source column 5022 indicates the column as the source of event occurrence in the explanatory variable table 127. In the example of FIG. 5, the event ID 5021 indicates that the event "a1" has been generated from "remaining memory" of the explanatory variable table 127.

The data type 5023 indicates the data type prior to abstraction. The data type may include numerical value and text, for example.

The event expression 5024 indicates the correspondence with the data prior to abstraction. For example, the event "a1" indicates that the "remaining memory" is in the range of "53000 to 54000". Meanwhile, even when the abstraction process has been performed, the original data may remain unchanged. In this case, the value of the original data may be used as the event expression 5024 as is. When a text has been abstracted, an abbreviated expression generated by a text abstraction process is used as the generated event expression 5024.

<Example of Time-Series Data Analysis Parameter>

FIG. 6 is a diagram illustrating an example of the time-series data analysis parameter 204 according to the present embodiment. The time-series data analysis parameter 204 includes, e.g., the constituent items of column ID 601, pattern type 602, maximum number of elements 603, window width (number) 604, window width (time) 605, and minimum frequency 606.

The column ID 601 is information indicating the column of the explanatory variable from which a time-series pattern is to be extracted.

The pattern type 602 is information indicating the type of time-series pattern. The time-series pattern represents the temporal feature or sequential feature of an event, where the possible method of representation may include a plurality of types. In FIG. 6, for example, three types of patterns of n-gram, association, and sequence are defined. Hereafter, each of the pattern types will be described.

(i) N-Gram

The n-gram indicates a list of events that are temporally successively generated. For example, "a1=>a4" means that event a4 was generated immediately after event a1. This is an n-gram with the number of elements 2 (i.e., 2-gram). An n-gram with the number of elements 3 (3-gram) is indicated by "a1=>a4=>a3". The N-gram is a feature quantity which represents a transition between events.

(ii) Association

The association refers to a feature quantity indicating that a plurality of events are being generated (co-occurring) within a certain time interval. In the association, as opposed to N-gram, the order of generation is not considered, and the feature quantity is defined for each number of elements. For example, "{a1, a4}" means that a1 and a4 co-occurred in a session. The association is a feature quantity that represents the co-occurrence between events.

(iii) Sequence

The sequence refers to a feature quantity which indicates that a plurality of events are being generated in a certain order within a certain time interval. In the sequence, as opposed to association, the order of generation is considered, and, as opposed to n-gram, it is not necessarily required that events be generated successively. For example, "a1>a3" means that a1 and a3 were generated in this sequence in a session. It should be noted, however, that another event may be generated between a1 and a3. The sequence is a feature quantity which represent the ordering between events.

The maximum number of elements 603 indicates a maximum value of the number of elements (the number of events) of the time-series pattern to be extracted. Generally, a time-series pattern is generated in a combination of events. Accordingly, as the number of elements (the number of events) increases, the type of time-series pattern also increases. By setting a maximum value to the number of elements, it becomes possible to limit the type of time-series pattern.

The window width (number) 604 defines a number width of the events (records) as the basis of extraction of the time-series pattern. Only when a plurality of certain events are being generated within a number of events smaller than the window width 604, a time-series pattern is extracted. By limiting the number width of the original data (events) for time-series pattern extraction, it becomes possible to extract a highly relevant feature quantity.

The window width (time) 605 defines a time width for extraction of time-series pattern. Only when a plurality of certain events are being generated at an interval smaller than the window width 605, a time-series pattern is extracted. Generally, it is believed that events that are greatly temporally spaced apart from each other have a small relevance. By setting the window width 604, it becomes possible to avoid generation of a feature quantity between events that are temporally greatly spaced apart from each other.

The minimum frequency 606 indicates a minimum value of the number of sessions including a time-series pattern of interest. The minimum frequency 606 may be indicated by the number of sessions per se, or by a ratio to the number of all sessions. That the number of sessions in which the time-series pattern appears is high does not necessarily mean a high correlation to the objective variable. However, if the number of sessions with an appearance is too small, it becomes impossible to obtain a sufficient amount of sample for correlation computation, and the reliability of the computed correlation value is decreased. Accordingly, it is necessary to ensure that more than a certain number of samples can be obtained. By setting the minimum frequency 606, it becomes possible to eliminate time-series patterns with a small number of samples from the object of computation of the correlation coefficient. Setting the minimum frequency 606 also provides the advantage of being able to utilize an algorithm (such as apriori or apioriAll) for an efficient search for time-series pattern.

<Example of Time-Series Pattern Table>

FIG. 7 is a diagram illustrating an example of the time-series pattern table 205 according to the present embodiment. The time-series pattern table 205 includes the constituent items of, e.g., pattern ID 701, time-series pattern type 702, time-series pattern 703, and appearance session list 704.

The pattern ID 701 is identification information for uniquely specifying or identifying a time-series pattern.

The time-series pattern type 702 is the type of time-series pattern of interest, and is the same information as the time-series pattern type 602 of FIG. 6. For example, information such as n-gram, association, or sequence is retained.

The time-series pattern 703 indicates the specific value of the time-series pattern extracted by the time-series pattern extraction process 203. The record with pattern ID=1 in FIG. 7 indicates that, by way of example, "a1=>a2" indicating 2-gram has been extracted as a time-series pattern.

The appearance session list 704 a list of tuples of the session ID with respect to which the time-series pattern of interest appeared and the number of times of its appearance ("appearance session ID", "the number of times of appearance"). In FIG. 7, the record with pattern ID=1 indicates that there were four appearances in the case of session ID=1, and three appearances in the case of session ID=2. In FIG. 7, no sessions with the number of times of appearance of zero are being displayed. However, the numbers of times of appearance of time-series pattern with respect to all of the sessions are being retained. In the correlation computing process 206, as will be described later, a correlation value between the objective variable and the time-series pattern is computed based on the appearance session list 704.

<Example of Time-Series Analysis Result>

FIG. 8 is a diagram illustrating an example of the time-series analysis result 207 according to the present embodiment. The time-series analysis result 207 includes the constituent items of pattern ID 801 and correlation value column 802.

The pattern ID 801 is identification information for uniquely specifying or identifying the time-series pattern extracted by the time-series pattern extraction process, and corresponds to the pattern ID 701 of the time-series pattern table 205 of FIG. 7.

The correlation value column 802 indicates the correlation value between the number of times of generation of the time-series pattern expressed by the pattern ID and the objective variable. The correlation value column 802 is defined for each objective variable. In the example of FIG. 8, it is indicated that the correlation value between the number of times of appearance of the time-series pattern with the pattern ID=1 and the objective variable 1 (such as average utilization) is 0.42. The details of a method for computing the correlation value will be described with reference to FIG. 13.

<Text Abstraction Process>

FIG. 9 is a diagram illustrating an example of the text abstraction process cording to the present embodiment. The text abstraction process is performed to cluster a set of similar texts into a single label. The text abstraction process is performed, e.g., in the two stages of (i) clustering process, and (ii) abbreviated expression generation process. The processes will be described hereafter.

(i) Clustering Process

In order to cluster texts, it is necessary to set a similarity or distance function between the texts. As a distance function between texts, a function called edit distance is known. The edit distance is defined as a minimum number of times of a procedure required for modifying one character string into another character string by insertion, deletion, or substitution of one character. A technique for efficiently computing the edit distance using a dynamic programming is disclosed in the document below.

E. W. Myers: "An O(ND) difference algorithm and its variations", Algorithmixa, 1, pp. 251-266 986.

By utilizing the distance function between texts, it becomes possible to cluster texts. The clustering can be performed using a known clustering algorithm, such as Ward's method.

(ii) Abbreviated Expression Generation Process

In the abbreviated expression generation process, each cluster is allocated a unique label to convert texts into a label. While labels may suffice for simple extraction of a time-series pattern; an abbreviated expression is generated to assist an analyst's interpretation. The abbreviated expression is generated by the following method. First, a common portion character string is extracted from a text set that belongs to a cluster. Then, the portions other than the common portion character string are substituted with a code (such as "*").

In FIG. 9, by performing the clustering process on the text set 901, text data groups 902 that belong to respective clusters are obtained. The common portions are extracted from each cluster (each of cluster ID=1 and cluster ID=2). For example, in the case of cluster ID=1, "Router interface down" are the common portions. In the case of cluster ID=2, "Authentication fail" are the common portions.

Then, an abbreviated expression 903 is generated for each cluster. For example, in the case of cluster ID=1, "Router*interface*down" is the abbreviated expression. In the case of cluster ID=2, "Authentication*fail*" is the abbreviated expression.

<Numerical Value Abstraction Process>

Figure 10:
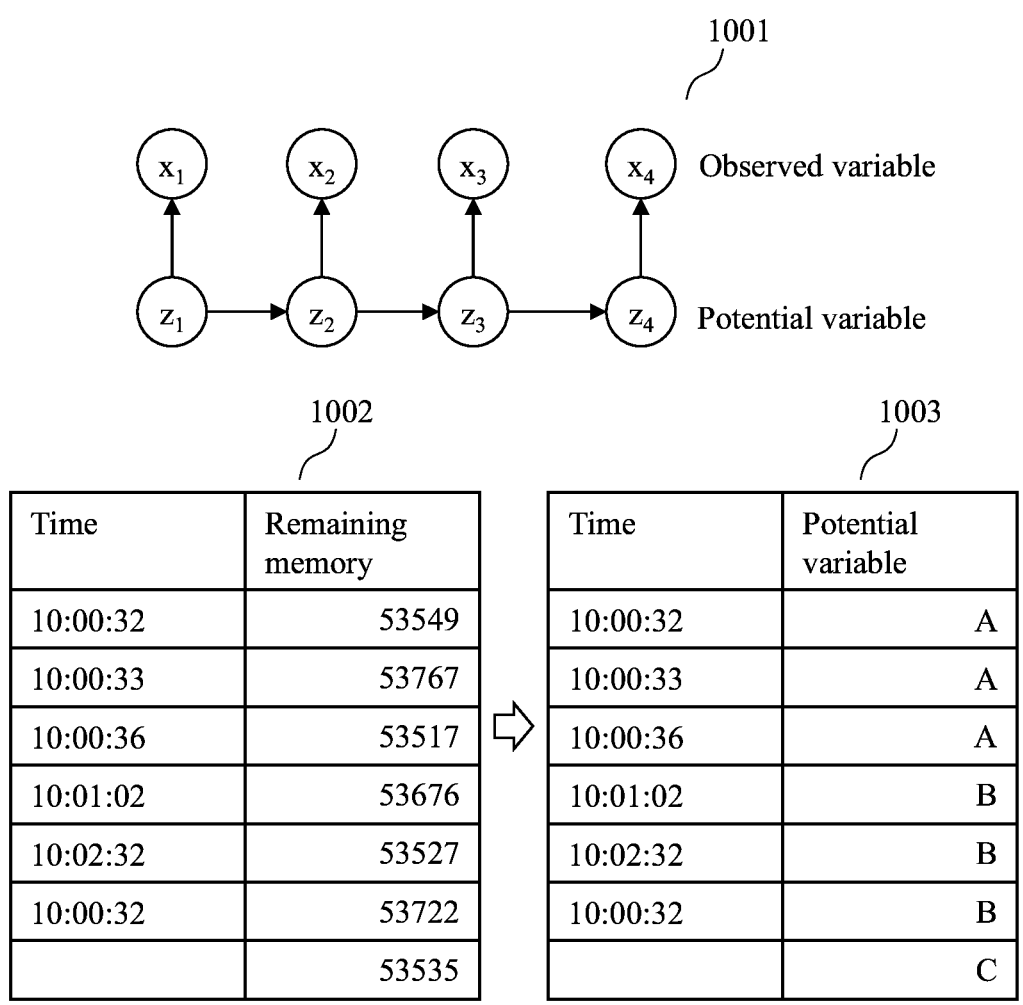
FIG. 10 illustrates an example of a numerical value abstraction process according to the present embodiment.

FIG. 10 is a diagram illustrating an example of a numerical value abstraction process according to the present embodiment. The numerical value abstraction process is performed to convert successive numerical values into discrete labels. The numerical value abstraction process may be performed by a plurality of methods. In the present example, (i) a method by quantization and (ii) a method by hidden state estimation will be described. For example, by using either or both of methods (i) and (ii), it becomes possible to convert a string of numerical value data into a string of discrete labels.

(i) Method by Quantization

In a simple method, a range determined by the minimum value and the maximum value of an explanatory variable is equally divided into a predetermined division number (such as 10). In this method, however, if the data distribution is biased, the number of numerical values that enter the divided areas will also be biased. Accordingly, data are divided as uniformly as possible by finely dividing portions of the data distribution where the density is large, and coarsely dividing portions where the density is small. As a technique for dividing in accordance with the data distribution density, Grid-base clustering is known, as indicated in the following document.

R. Agrawal, J. Gehrke, D. Gunopulus, and P. Raghavan, "Automatic Subspace Clustering of High Dimensional Data for Data Mining Applications," Proc. ACM/SIGMOD Int'l Conf. Management of Data, pp. 94-105, 1998.

Use of the method by quantization makes it possible to, e.g., determine the range of event expression in FIG. 5.

(ii) Method by Estimation of Potential Variable

A technique is known for estimating a potential variable from an observed data string based on the assumption of the presence of the potential variable behind a data string being observed. For example, a hidden Markov model and the like may be utilized. The hidden Markov model estimates the transition probability $A_{ij}=Pr(z_j|z_i)$, initial probability $\pi_i=Pr(z_1)$, and output probability $Pr(x_i|z_i)$ of a potential variable from an observed string $\{x_i\}$ 1001. As an estimation algorithm, Baum-Welch algorithm is known. As an algorithm for estimating the potential variable, Vitabi algorithm is known. By applying such algorithms, it becomes possible to estimate a string of potential variables 1003 from the observed string $\{x_i\}$ 1001 (which correspond to remaining memory 1002 in the example of FIG. 10). In order to utilize the hidden Markov model, it is necessary to determine the number of states in advance. As a technique that does not involve prior designation of the number of states, nonparametric Bayes is known, for example, as disclosed in the following document. Such algorithm may also be applied.

Y. W. The, M. I. Jordan, M. J. Beal, and D. M. Blei. "Hierarchical Dirichlet processes." Journal of the American Statistical Association, 101(476):1566-1581, 2006.

<Data Abstraction Process>

Figure 11:
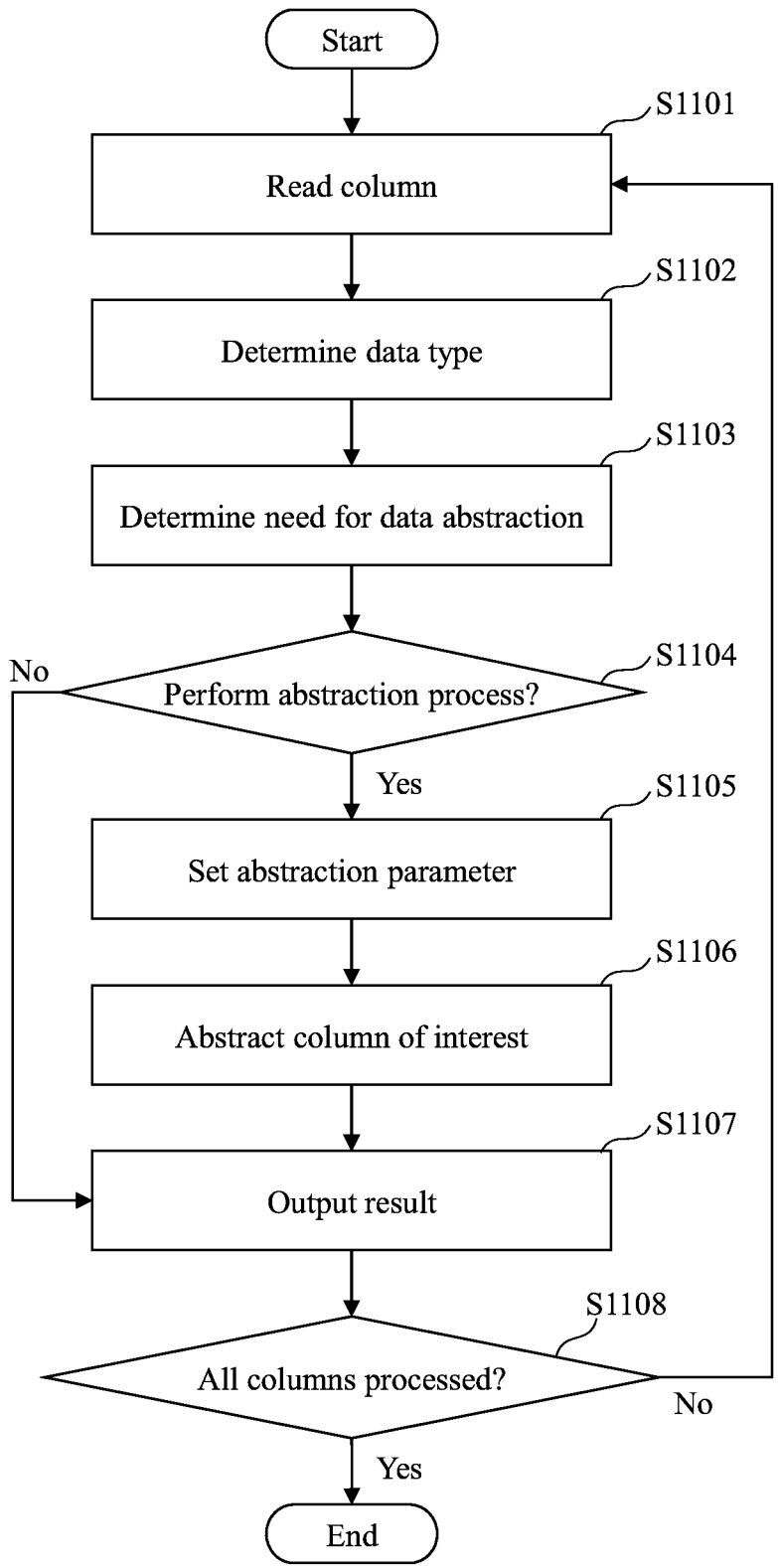
FIG. 11 is a flowchart (example) for describing the details of a data abstraction process 201 performed by the time-series data analysis unit 123.

FIG. 11 is a flowchart (example) for describing the details of the data abstraction process 201 performed by the time-series data analysis unit 123. As described above, the time-series data analysis unit 123 is implemented with a program, for example. Accordingly, in the following description, the agent of operation may be considered a processor (CPU). The data abstraction process 201 is started upon reading of the explanatory variable table 127.

(i) Step 1101

The time-series data analysis unit 123 selects one column from the explanatory variable columns 404 of the explanatory variable table 127. If the step is performed for the first time, any column of the explanatory variable columns 404 may be selected. If the step is performed for the second time or later, a column that is yet to be selected is selected. Upon selection of the column, the process proceeds to step 1102.

(ii) Step 1102

The time-series data analysis unit 123 determines the data type 5023 of the column selected in step 1101. The data type 5023 may include numerical value data and text data. The data determination may be performed by a manual method and an automatic method.

When performed manually, the analyst determines the labels of "numerical value data" or "text data" in advance with respect to each column, and saves labels together with the data to be analyzed 111. The time-series data analysis unit 123 refers to the labels saved together with the data to be analyzed 111, and determines whether the column is "numerical value data" or "text data".

When performed automatically, the time-series data analysis unit 123 scans the values included in the relevant column and makes a determination based on the type of character string. If the values of the column include a character string other than numerical values (0 to 9), the data type is determined to be text data. If all of the data are constituted by numerical value data, the data type is determined in accordance with the distribution of data. This is in consideration of cases where it is desired to determine data comprising numerical values also as being text data, such as in the case of ID information. For example, ID information such as "001" and "002" does not have a meaning in the magnitude of their numerical values. Such information is referred to as a nominal scale. On the other hand, temperatures (10.3, 10.5) and the like where the magnitude of the numerical value has a meaning are referred to as a ratio scale. While nominal scale and ratio scale cannot be distinguished merely by the type of character string, the distinction can be made by utilizing the difference in data distribution. For example, it becomes possible to distinguish the scales based on the characteristics that ratio scale data take a distribution close to a normal distribution, whereas a nominal scale takes a distribution close to a uniform distribution. After the data type 503 is determined, the process proceeds to step 1103.

(iii) Step 1103

The time-series data analysis unit 123 determines whether to perform the abstraction process with respect to the selected column. As described above, the purpose of the abstraction process is to reduce the types of explanatory variable values to extract a time-series pattern that is easy to understand. If the types of the original explanatory variable value are not many, the abstraction process may not be performed (for simpler processing). The determination may be made according to a standard such that, for example, an upper limit value is set for a unique number (the number of types of column values) of the explanatory variable values, and it is determined that the abstraction process should not be performed when the unique number of the values included in the selected column is less than the upper limit value. After the determination, the process proceeds to step 1104.

(iv) Step 1104

The time-series data analysis unit 123 determines whether to perform the abstraction process based on the result of step 1103. It is determined that the abstraction process is to be performed (Yes in step 1104), the process proceeds to step 1105. If not to be performed (No in step 1104), the process proceeds to step 1107.

(v) Step 1105

The time-series data analysis unit 123 sets the parameters to be used for abstraction. In the case of text abstraction, a threshold value and the like used for clustering is set. In the case of numerical value abstraction, the number of elements of a potential variable and the like is set as a parameter. For example, the analyst is prompted to input the parameters. After the analyst inputs the parameters, the time-series data analysis unit 123 sets the parameters as a threshold value or the number of elements, for example. If the analyst has input the parameters in advance prior to the start of analysis, the time-series data analysis unit 123 reads the parameters and sets them as a threshold value or the number of elements, for example. After the parameters are set, the process proceeds to step 1106.

(vi) Step 1106

The time-series data analysis unit 123 performs the column value abstraction process. The abstraction process is performed separately for the numerical value data and text data of the column. The concrete content of the abstraction process for numerical value data is as described with reference to FIG. 10. The concrete content of the abstraction process for text data is as described with reference to FIG. 9. After the abstraction process, the process proceeds to step 1107.

(vii) Step 1107

The time-series data analysis unit 123 outputs the currently abstracted column to the abstraction explanatory variable table 501. Thereafter, the process proceeds to step 1108.

(viii) Step 1108

The time-series data analysis unit 123 determines whether the abstraction process has been performed with respect to all of the columns among the explanatory variable columns 404 included in the explanatory variable table 127. If all of the columns have been subjected to the abstraction process (Yes in step 1108), the process ends. If there is a column to be processed (No in step 1108), the process returns to step 1101.

<Time-Series Pattern Extraction Process>

Figure 12:
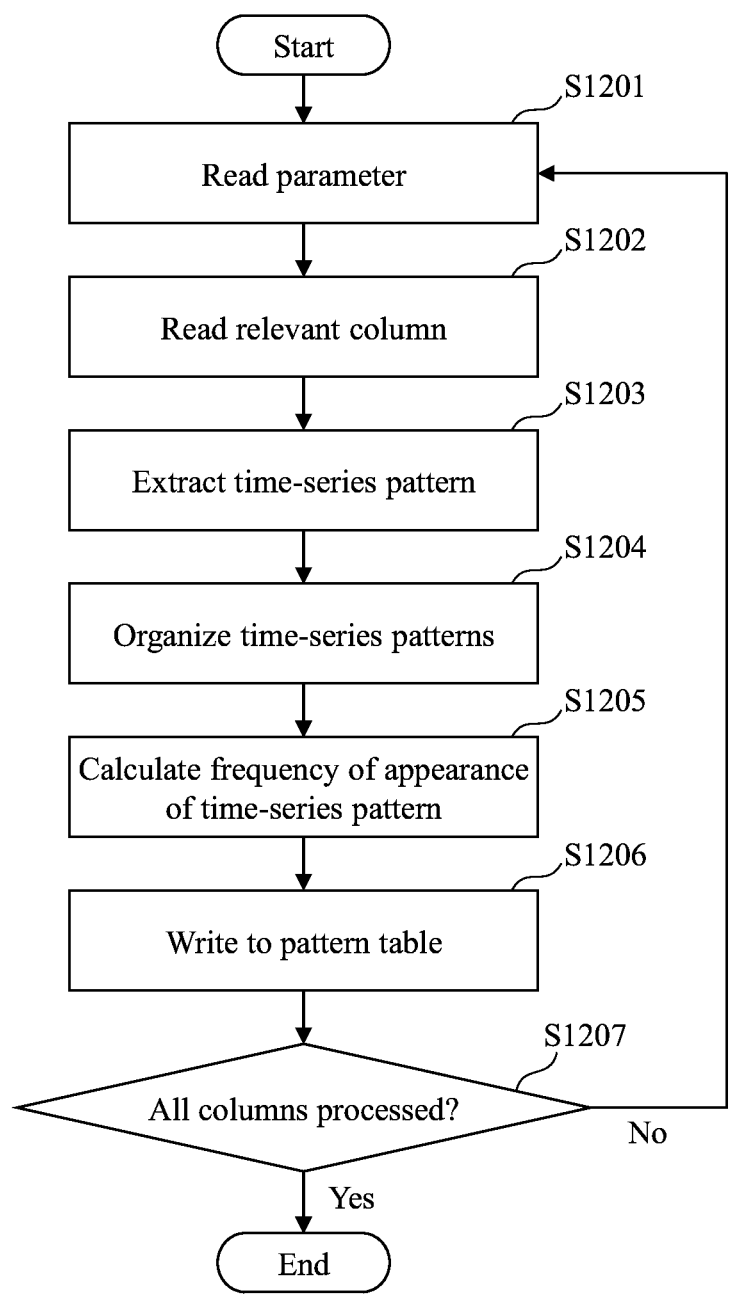
FIG. 12 is a flowchart (example) for describing the details of a time-series pattern extraction process 203 performed by the time-series data analysis unit 123.

FIG. 12 is a flowchart (example) for describing the details of the time-series pattern extraction process 203 performed by the time-series data analysis unit 123. As described above, the time-series data analysis unit 123 is implemented with a program. Accordingly, in the following description, the agent of operation may be considered a processor (CPU). The time-series pattern extraction process 203 is started at the timing of reading of the abstraction data 202.

(i) Step 1201

The time-series data analysis unit 123 reads one record of the time-series analysis parameter 204. After the reading, the process proceeds to step 1202.

(ii) Step 1202

The time-series data analysis unit 123, based on the column ID of the record read in step 1201, reads the abstraction explanatory variable column 403 of the abstraction explanatory variable table 501. For example, because the first record in FIG. 6 has the column ID "remaining memory", the event table 502 is referenced and the event ID corresponding to the generation source column "remaining memory" is acquired. Because the event ID is "a1, a2, . . . ", the "event A" column of the abstraction explanatory variable table 501 is selected, and the values in the column are read. After the reading, the process proceeds to step 1203.

(iii) Step 1203

The time-series data analysis unit 123, based on the time-series data analysis parameter read in step 1201, extracts a time-series pattern from the data of the abstraction explanatory variable column read in step 1202. The extraction method for each type of time-series pattern will be described in the following.

(iii-1) When Time-Series Pattern Type 602 is N-Gram

The number of elements k is varied from 2 to the maximum number of elements 603, and the following process is performed.

Step 1: An event string is read for each session ID. In the example of event A in FIG. 5, the event string is (a1, a1, a2, a2, a1).

Step 2: The k-gram is generated. In the present example, (a1=>a1, a1=>a2, a2=>a2, a2=>a1) is generated.

Step 3: If the difference in the time of occurrence between the first element and the last element is not greater than the window width 605, the k-gram is registered. If greater than the window width 605, the k-gram is not registered. In the present example, the time difference between the explanatory number record ID=1(a1) and the explanatory variable record ID=5(a1) is greater than 10 minutes (window width 605), the explanatory variable ID=5 is not registered. Accordingly, in this case, only (a1=>a1, a1=>a2, a2=>a2) is registered.

Step 4: Steps 1 to 4 are performed for all of the session IDs (session 1, session 2, . . . ), and the number of times of appearance of k-gram is counted.

Step 5: Only the n-gram that exceeds the minimum frequency 606 is output.

(iii-2) Case of Association

Extraction of the time-series pattern using the Apriori algorithm will be described. The details of the Apriori algorithm are described in, e.g., the document "R. Agrawal and R. Srikant, "Fast algorithms for mining association rules in large databases," Proceedings of the 20th International Conference on Very Large Data Bases, VLDB, pages 487-499, Santiago, Chile, September 1994".

Initialization: Of the time-series patterns with the number of elements 1, those exceeding the minimum frequency 606 are all listed up and designated L_1 (Example: L_1=<{a1}, {a2}, {a3}>). Then, with k=1, the following steps 1 to 3 are repeated until the number of elements reaches the maximum number of elements 603 or until L_k becomes an empty set.

Step 1: Of the time-series patterns with the number of elements k, those exceeding the minimum frequency 606 are all listed up and designated L_1 (Example: L_1=<{a1}, {a2}, {a3}>).

Step 2: L_k is combined to generate time-series pattern candidates of the number of elements k+1, yielding C_k+1 (C_2={a1, a2}, {a2, a3}, {a3, a1}).

Step 3: A search for sessions in which the elements of C_k+1 appear. In this case, whether the elements appear or not is determined in consideration of the window width 604. For example, even when a1 and a2 are included in a session, if the interval between a1 and a2 exceeds the window width (number) 604, it is determined that the {a1, a2} does not appear in that session. Only those with the number of appearing sessions exceeding the minimum frequency 606 are left, yielding L_k+1 (L_2={a1, a2}, {a2, a3}).

(iii-3) Case of Sequence

Extraction of the time-series pattern using the AprioriAll algorithm will be described. The details of the AprioriAll algorithm are described in the document "R. Agrawal and R. Srikant, 'Mining Sequential Patterns,' Proc. of The 11th Int'l Conf. on Data Engineering, pp. 3-14, 1995".

Initialization: Of the time-series patterns with the number of elements 1, those in which the number of appearing sessions exceeds the minimum frequency 606 are all listed up and designated L_1 (Example: L_1=<a1, a2, a3>). With k=1, steps 1 and 2 are repeated until the number of elements reaches the maximum number of elements 603 or until L_k becomes an empty set.

Step 1: L_k is combined to generate time-series pattern candidates of the number of elements k+1, yielding C_k+1. In this case, the time-series pattern candidates satisfy the condition that all of the partial series of each element are included in L_k (Example: C_2=a1>a2, a2>a3, a3>a1).

Step 2: Each element of C_k+1 is searched on a session by session basis, and it is determined whether a time-series pattern is included in the session. The determination is made in consideration of the window width (number) 604 and the window width (time) 605, as in the case of association. The appearance frequency is calculated, and only the time-series patterns exceeding the minimum frequency 606 are left, yielding L_k+1 (L_2=a1>a2, a2>a3).

After the event pattern is extracted by the above method, the process proceeds to step 1204.

(iv) Step 1204

The time-series data analysis unit 123 organizes the time-series patterns extracted in step 1203. The organization of the time-series patterns may include deletion of a time-series pattern in an inclusive relation. For example, a process is performed such that, at locations where the time-series pattern "a=>b" of n-gram appears, whenever "a=>b=>c" appears, the "a=>b=>c", of which the number of elements is greater, is adopted as the time-series pattern. In this way, it becomes possible to reduce the number of time-series patterns to be confirmed by the analyst. After the time-series patterns are organized, the process proceeds to step 1205.

(v) Step 1205

The time-series data analysis unit 123, with respect to the time-series patterns organized in step 1204, calculates the appearance frequency for each session. In order to reduce computing amount, the appearance frequency may be calculated during the time-series pattern extraction process. After the appearance frequency is calculated, the process proceeds to step 1206.

(vi) Step 1206

The time-series data analysis unit 123 writes the appearance frequency calculated in step 1205 to the time-series pattern table 205. After the appearance frequency is written to the time-series pattern table 205, the process proceeds to step 1207.

(vii) Step 1207

The time-series data analysis unit 123 determines whether the time-series pattern extraction process has been performed with respect to all of the records of the time-series analysis parameter 204. If the process has been completed with respect to all of the records (Yes in step 1207), the process ends. If there is a record to be processed (No in step 1207), the process returns to step 1201.

<Correlation Computing Process>

Figure 13:
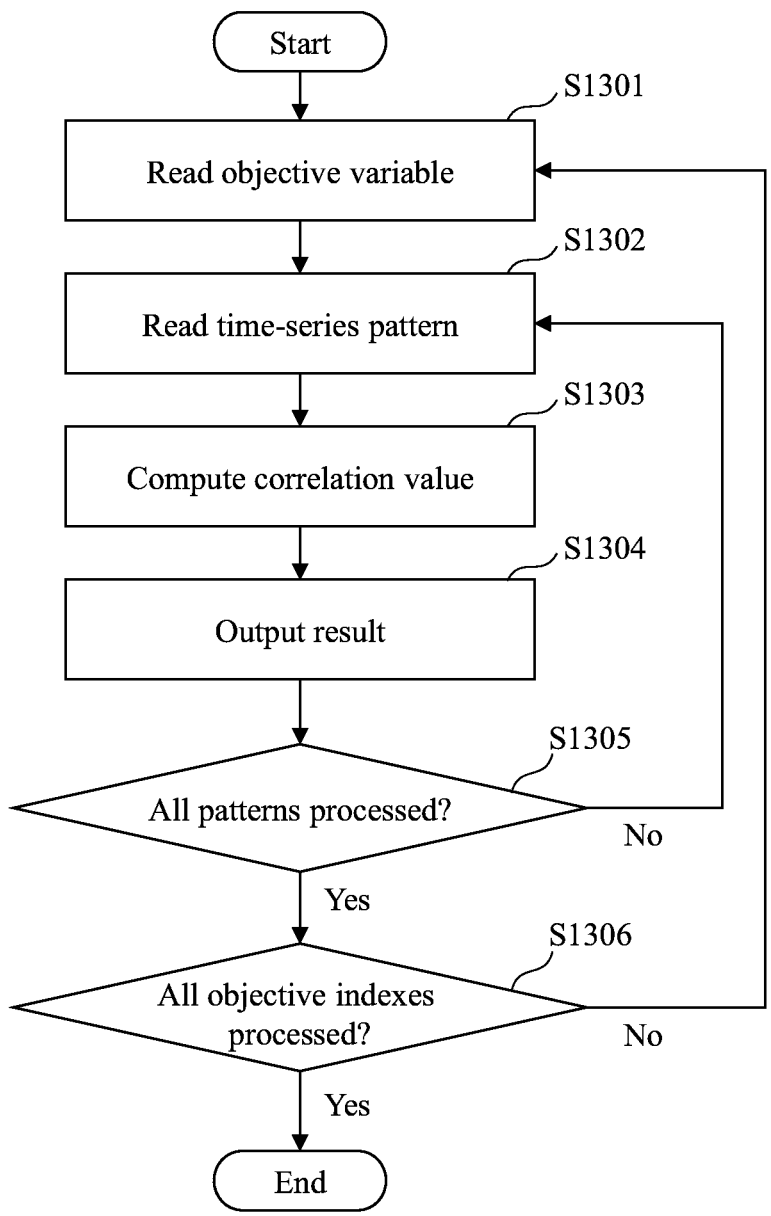
FIG. 13 is a flowchart (example) for describing the details of a correlation computing process 206 performed by the time-series data analysis unit 123.

FIG. 13 is a flowchart (example) for describing the details of the correlation computing process 206 performed by the time-series data analysis unit 123. As described above, the time-series data analysis unit 123 is implemented with a program, for example. Accordingly, in the following description, the agent of operation may be considered a processor (CPU). The correlation computing process 206 is started at the timing of reading the time-series pattern table 205 and the objective variable.

(i) Step 1301

The time-series data analysis unit 123 selects from the objective variable table 126 one of the objective variable columns 302. When the correlation computing process 206 is performed for the first time, any column of the explanatory variable columns 404 may be selected. In the case of the second process or later, any of the columns yet to be selected may be selected. After the column is selected, the process proceeds to step 1302.

(ii) Step 1302

The time-series data analysis unit 123 selects one record from the time-series pattern table 205. In the following, a correlation value concerning a time-series pattern included in the selected record is computed. After the record is selected, the process proceeds to step 1303.

(iii) Step 1303

The time-series data analysis unit 123 computes the correlation value between the objective variable selected in step 1301 and the time-series pattern selected in step 1302. For computing the correlation value, Pearson's correlation coefficient may be used, for example. In this case, by referring to the time-series pattern table 205, the time-series data analysis unit 123 can obtain the number of times of appearance fi in the session i of the time-series pattern of interest. The time-series data analysis unit 123 can also, by referring to the objective variable table 126, obtain the value yi of the objective variable of interest. Using the fi and yi, Pearson's correlation coefficient is expressed by the expression indicated below. The time-series data analysis unit 123 computes the correlation value based on the expression. After the correlation coefficient is computed, the process proceeds to step 1304.

$$R = \sum_i \frac{(fi - \overline{fi})(yi - \overline{yi})}{\sqrt{(fi - \overline{fi})^2}\sqrt{(yi - \overline{yi})^2}}$$

where $\overline{fi}$ and $\overline{yi}$ respectively indicate the mean of fi and yi in a session. The sum ($\Sigma$) is taken with respect to the entire sessions, and R takes a real number of −1 to 1 inclusive.

(iv) Step 1304

The time-series data analysis unit 123 outputs the computed result to the time-series analysis result 207. After the computed result is output, the process proceeds to step 1305.

(v) Step 1305

The time-series data analysis unit 123 determines whether the correlation computing process has been performed with respect to all of the records of the time-series pattern table 205. If the correlation computing process has been performed with respect to all of the records (Yes in step 1305), the process proceeds to step 1306. If there is a record yet to be processed (No in step 1305), the process returns to step 1302.

(vi) Step 1306

The time-series data analysis unit 123 determines whether the correlation computing process has been performed with respect to all of the objective variables. If the correlation computing process has been performed with respect to all of the objective variables (Yes in step 1306), the process ends. If there is an objective variable yet to be processed (No in step 1306), the process returns to step 1301.

<Analysis Result Report Display Example>

FIG. 14 is a diagram illustrating an example of an analysis result report according to the present embodiment. An analysis report display screen generated based on the analysis report 128 includes a time-series pattern display screen 1401 and a data to be analyzed view screen 1402, for example.

The time-series pattern display screen 1401 includes a pattern list 14011, a pattern details screen 14012, and a graph screen 14013, for example.

The pattern list 14011 lists up the information of at least one time-series pattern extracted by the time-series data analysis unit 123. The pattern list 14011 displays the pattern ID of the time-series pattern listed up, the type of the time-series pattern, and the correlation value with the objective variable, for example. In the pattern list 14011, the time-series patterns are displayed in the order of decreasing absolute value of the correlation value. In this way, it becomes possible to assist the analyst's confirmation operation. When there is a plurality of objective variables, a plurality of correlation values are displayed corresponding to the objective variables. For example, in the case of FIG. 8, the correlation values corresponding to the objective variables 1, 2, . . . (such as 0.42 and 0.23 for pattern ID=1) are respectively displayed. The correlation values of a predetermined threshold value or more may be listed up.

The pattern details screen 14012 displays the detailed information of the time-series pattern selected in the pattern list 14011 (for example, when a time-series pattern is selected in the pattern list 14011, the pattern ID is displayed in bold letter). For example, the event expression 5024 of the event of the time-series pattern is displayed. In this way, it becomes possible for the analyst to easily interpret the time-series event.

The graph screen 14013 displays a graph and the like indicating the relationship between the objective index (objective variable) and the number of times of appearance of the time-series pattern. In this way, it becomes possible for the analyst to visually confirm the correlation between the objective index and the time-series pattern.

The data to be analyzed view screen 1402 is a screen for confirming the location of appearance of a time-series pattern, and displays the location of appearance of the time-series pattern selected in the data to be analyzed 111 in highlight, for example. The location of appearance of the time-series pattern selected in a session is identified based on the appearance session list 704 of the time-series pattern table 205. By searching the records in the session based on the event expression 5024 included in the event table 502, it becomes possible to identify the record corresponding to the time-series pattern.

<Summary>

(i) In the present embodiment, with respect to the explanatory variable data included in the data to be analyzed, a time-series pattern (a plurality of types of time-series pattern (such as N-gram, association, and sequence)) is generated in a predetermined range (each session). Also, the correlation value between the time-series pattern and objective variable data (at least one extracted from the data to be analyzed) is calculated. Together with the correlation value, the time-series pattern corresponding to the correlation value is output as an analysis result. In this way, the time-series pattern is extracted from the explanatory variable data, so that it becomes possible to extract the factor (event pattern) that has an influence on the objective variable (objective index) without the analyst making a hypothesis. In addition, it becomes possible to discover the factor that has an influence on the objective variable without depending on the appearance frequency.

Further, in the present embodiment, the explanatory variable data are abstracted based on a predetermined rule. Then, a time-series pattern is generated with respect to the abstracted explanatory variable data. In this way, it is possible to reduce the types of explanatory variable value and extract a time-series pattern that is easy to understand. During the abstraction, with respect to text data, a clustering process is performed based on the similarity in the character strings of the text data, and classified text data are converted into labels, for example. With respect to numerical values, the numerical values are converted into labels based on the occurrence distribution of the numerical values, for example. In this way, it becomes possible to analyze the time-series data without requiring prior knowledge about the text or numerical values.

When the analysis result is output, only those time-series patterns of which the correlation value indicates a predetermined threshold value or more may be output. In this way, it becomes possible to present only those factors that have a large influence on the objective variable.

When the analysis result is output, the location of appearance of time-series pattern in the data to be analyzed is indicated. In this way, it becomes possible to confirm in what situation the time-series pattern has occurred.

In addition, when the analysis result is output, the information indicating the relationship between the number of appearances of time-series pattern in each of a plurality of sessions and the objective variable is output. In this way, it becomes possible to visually confirm the correlation between the time-series pattern and the objective variable not just through the numerical value of correlation value.

(ii) The present disclosure may be implemented by means of a software program code for implementing the functions of the embodiment. In this case, a system or a device may be provided with a storage medium having the program code recorded thereon, and a computer of the system or device (or CPU or MPU) may read the program code stored in the storage medium. In this case, the program code per se read from the storage medium implements the functions of the embodiment, and the program code per se, and the storage medium having the program code stored therein would constitute the present disclosure. Examples of the storage medium for supplying the program code may include flexible discs, CD-ROM, DVD-ROM, hard disks, optical disks, magneto-optical disks, CD-R, magnetic tape, nonvolatile memory cards, and ROM.

Based on the instructions of the program code, an actual process may be partly or entirely performed by an operating system (OS) and the like running on the computer, wherein the functions of the embodiment may be implemented by the process. In addition, the program code read from the storage medium may be written to a memory on the computer, and then an actual process may be partly or entirely performed by the CPU and the like of the computer based on the program code instructions, wherein the functions of the embodiment may be implemented by the process.

The software program code for implementing the functions of the embodiment may be delivered via a network, stored in a storage means of the system or device, such as a hard disk or memory, or in the storage medium such as CD-RW or CD-R. The program code stored in the storage means or the storage medium may be read by the computer (or CPU or MPU) of the system or device and performed in use.

Finally, it is to be understood that the processes and techniques described herein are essentially not associated with any particular device, and may be implemented by any appropriate combination of components. Various types of general-purpose devices may be used in accordance with the teachings described herein. It may be appreciated that it is beneficial to construct a dedicated device to perform the method steps described herein. The constituent elements disclosed in the embodiment may be combined as appropriate to form various inventions. For example, some constituent elements may be deleted from the constituent elements of an embodiment. Constituent elements included in different embodiments may be combined as appropriate. While the present disclosure has been described with reference to specific examples, these are to be construed in all aspects as illustrative and not restrictive. It will be appreciated by those skilled in the art that a number of combinations of hardware, software, and firmware appropriate for implementing the present disclosure may exist. For example, the software described may be implemented using a wide range of programs or script languages, such as assembler, C/C++, perl, Shell, PHP, and Java (registered trademark).

In the embodiment described above, the control lines and information lines are only those considered necessary for illustrative purposes, and do not necessarily represent all of the control lines or information lines present in a product. All of the configurations may be mutually connected.

In addition, other implementations of the present disclosure may occur to those skilled in the art when consideration is given to the descriptions and embodiments of the present disclosure disclosed herein. The various modes and/or components of the described embodiments may be used either individually or in any combination. It is intended that the description and the specific examples be considered as exemplary only, with the scope and spirit of the present disclosure being defined by the following claims.

REFERENCE SIGNS LIST

1 Time-series data analysis system
101 Network
110 System to be analyzed
111 Data to be analyzed
120 Analysis server
121 Data collection unit
122 Data shaping unit
123 Time-series data analysis unit
124 Report display unit
125 Parameter setting unit
126 Objective variable table
127 Explanatory variable table
128 Analysis report

The invention claimed is:

1. An analysis server device comprising a storage device in which a program for analyzing data to be analyzed is stored, and a processor which reads the program from the storage device and analyzes the data to be analyzed,
wherein the processor is configured to perform:
a process of generating, with respect to explanatory variable data included in the data to be analyzed, a time-series pattern in a predetermined time range;
a process of calculating a correlation value between the time-series pattern and at least one objective variable data included in the data to be analyzed; and
a process of outputting, together with the correlation value, a time-series pattern corresponding to the correlation value as an analysis result,
wherein the processor further performs a process of abstracting the explanatory variable data based on a predetermined rule,
wherein, in the process of generating the time-series pattern, the processor is configured to generate the time-series pattern with respect to the abstracted explanatory variable data, and
wherein, in the abstraction process, the processor, with respect to text data included in the explanatory variable data, is configured to perform a clustering process based on similarity in character string of the text data, and converts the text data classified by the clustering process into a label.

2. The analysis server device according to claim 1, wherein, in the outputting process, the processor outputs the time-series pattern of which the correlation value is not less than a predetermined threshold value as the analysis result.

3. The analysis server device according to claim 1, wherein, in the outputting process, the processor is configured to output information indicating a location of appearance of time-series pattern in the data to be analyzed.

4. A data analysis system comprising:
the analysis server device according to claim 1;
a system to be analyzed in which the data to be analyzed are accumulated and which provides the analysis server device with the data to be analyzed; and
a terminal device for inputting at least a time-series data analysis parameter used when the time-series pattern is generated,
wherein the analysis server device, the system to be analyzed, and the terminal device are connected via a network.

5. An analysis server device comprising a storage device in which a program for analyzing data to be analyzed is stored, and a processor which reads the program from the storage device and analyzes the data to be analyzed,
wherein the processor is configured to perform:
a process of generating, with respect to explanatory variable data included in the data to be analyzed, a time-series pattern in a predetermined time range;
a process of calculating a correlation value between the time-series pattern and at least one objective variable data included in the data to be analyzed; and
a process of outputting, together with the correlation value, a time-series pattern corresponding to the correlation value as an analysis result,
wherein the processor further performs a process of abstracting the explanatory variable data based on a predetermined rule,
wherein, in the process of generating the time-series pattern, the processor is configured to generate the time-series pattern with respect to the abstracted explanatory variable data, and
wherein, in the abstraction process, the processor, with respect to a numerical value included in the explanatory variable data, is configured to convert the numerical value into a label based on an occurrence distribution of the numerical value.

6. An analysis server device comprising a storage device in which a program for analyzing data to be analyzed is stored, and a processor which reads the program from the storage device and analyzes the data to be analyzed,
wherein the processor is configured to perform:
a process of generating, with respect to explanatory variable data included in the data to be analyzed, a time-series pattern in a predetermined time range;
a process of calculating a correlation value between the time-series pattern and at least one objective variable data included in the data to be analyzed; and
a process of outputting, together with the correlation value, a time-series pattern corresponding to the correlation value as an analysis result,
wherein, in the process of generating the time-series pattern, the processor is configured to generate a plurality of types of time-series pattern with respect to each item of time-series data included in the explanatory variable data.

7. An analysis server device comprising a storage device in which a program for analyzing data to be analyzed is stored, and a processor which reads the program from the storage device and analyzes the data to be analyzed,
wherein the processor is configured to perform:
a process of generating, with respect to explanatory variable data included in the data to be analyzed, a time-series pattern in a predetermined time range;
a process of calculating a correlation value between the time-series pattern and at least one objective variable data included in the data to be analyzed; and
a process of outputting, together with the correlation value, a time-series pattern corresponding to the correlation value as an analysis result, wherein:

the data to be analyzed are divided into a plurality of sessions each being a unit of analysis;

in the process of generating the time-series pattern, the processor is configured to count a number of appearances of the time-series pattern in each of the plurality of sessions; and in the outputting process, the processor is configured to output information indicating a relationship between a number of times of appearance of the time-series pattern in each of the plurality of sessions and the objective variable data.

* * * * *